United States Patent
Zhang et al.

(10) Patent No.: US 10,609,725 B2
(45) Date of Patent: Mar. 31, 2020

(54) DATA TRANSMISSION METHOD OF SYSTEM, USER EQUIPMENT, AND BASE STATION

(71) Applicant: HUAWEI TECHNOLOGIES CO., LTD., Shenzhen, Guangdong (CN)

(72) Inventors: Lili Zhang, Beijing (CN); Richard Stirling-Gallacher, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/765,682

(22) PCT Filed: Dec. 10, 2015

(86) PCT No.: PCT/CN2015/096971
§ 371 (c)(1),
(2) Date: Apr. 3, 2018

(87) PCT Pub. No.: WO2017/096577
PCT Pub. Date: Jun. 15, 2017

(65) Prior Publication Data
US 2019/0090265 A1   Mar. 21, 2019

(51) Int. Cl.
*H04W 72/12* (2009.01)
*H04W 24/00* (2009.01)
(Continued)

(52) U.S. Cl.
CPC ....... *H04W 72/1289* (2013.01); *H04L 5/0007* (2013.01); *H04L 5/1438* (2013.01);
(Continued)

(58) Field of Classification Search
CPC ............. H04W 72/1289; H04W 72/14; H04W 72/042; H04L 5/0007; H04L 5/1438
See application file for complete search history.

(56) References Cited

U.S. PATENT DOCUMENTS

| 2011/0110339 A1* | 5/2011 | Jeong | H04W 72/042 370/335 |
| 2012/0113941 A1* | 5/2012 | Chung | H04W 72/1289 370/329 |

(Continued)

FOREIGN PATENT DOCUMENTS

| CN | 101646223 A | 2/2010 |
| CN | 101932111 A | 12/2010 |

(Continued)

OTHER PUBLICATIONS

Interdigital Communications:"Design considerations on LTE LAA DL and UL operation", 3GPP TSG-RAN WG1 Ad-Hoc Meeting. R1-151068. Paris, France, Mar. 24-26, 2015. total 5 pages. XP050951363.
(Continued)

*Primary Examiner* — Mohammad S Anwar
(74) *Attorney, Agent, or Firm* — Fish & Richardson P.C.

(57) ABSTRACT

The present invention discloses a data transmission method of a full-duplex system, a user equipment, and a base station. The UE is allowed to initiate full-duplex transmission, and it is unnecessary for the eNB to initiate full-duplex transmission. Before the initiation, the UE does not need to notify the eNB of buffer and preparation statuses of the UE. That is, the UE does not need to send related signaling to the eNB, thereby alleviating load of an entire LTE communications system, avoiding overload during data transmission, and reducing a transmission delay.

12 Claims, 3 Drawing Sheets

(51) Int. Cl.
*H04L 5/00* (2006.01)
*H04L 5/14* (2006.01)
*H04W 72/04* (2009.01)
*H04W 72/14* (2009.01)

(52) U.S. Cl.
CPC ......... *H04W 24/00* (2013.01); *H04W 72/042* (2013.01); *H04W 72/14* (2013.01)

(56) References Cited

U.S. PATENT DOCUMENTS

| | | | |
|---|---|---|---|
| 2013/0021954 A1 | 1/2013 | Montojo et al. | |
| 2013/0034071 A1* | 2/2013 | Lee ................... | H04W 74/0866 370/329 |
| 2013/0242824 A1 | 9/2013 | Lee et al. | |
| 2014/0328283 A1 | 11/2014 | Wan et al. | |
| 2014/0376422 A1 | 12/2014 | Dai et al. | |
| 2015/0109969 A1* | 4/2015 | Celebi ................. | H04L 5/0085 370/278 |
| 2017/0019894 A1* | 1/2017 | Nimbalker ............ | H04L 5/0053 |
| 2017/0048040 A1 | 2/2017 | Zhang et al. | |

FOREIGN PATENT DOCUMENTS

| | | |
|---|---|---|
| CN | 102158978 A | 8/2011 |
| CN | 102668666 A | 9/2012 |
| CN | 103220723 A | 7/2013 |
| CN | 103797749 A | 5/2014 |
| CN | 104378830 A | 2/2015 |
| CN | 105099601 A | 11/2015 |
| WO | 2015163701 A1 | 10/2015 |

OTHER PUBLICATIONS

LG Electronics:"Motivation for SI on flexible duplex operation for E-UTRAN,Flexible duplex—towards 5G efficient duplex mechanisms", 3GPP TSG RAN #66, RP-151939, Phoenix, US, Sep. 14-17, 2015. total 6 pages. XP051052836.

Extended European Search Report issued in European Application No. 15910052.8 dated Sep. 7, 2018, 8 pages.

Mayank Jain et al.,"Practical, Real-time, Full Duplex Wireless",MobiCom'11,dated 2011,total 12 pages.

Choi J et al.,"Achieving Single Channel, Full Duplex Wireless Communication",Mobicom'10,dated 2010,total 12 pages.

Radunovic B. Et al.,"Rethinking Indoor Wireless Mesh Design: Low Power, Low Frequency, Full-Duplex",dated 2010, total 6 pages.

Everett E et al.,"Empowering Full-Duplex Wireless Communication by Exploiting Directional Diversity",Asilomar,dated 2011,total 5 pages.

Achaleshwar Sahai et al.,"Pushing the limits of Full-duplex: Design and Real-time Implementation", Rice university technical report TREE1104,dated Jul. 4, 2011,total 12 pages.

International Search Report issued in International Application No. PCT/CN2015/096971 on 13 pages.

Office Action issued in Chinese Application No. 201580079636.2 dated Jun. 5, 2019, 14 pages (with English translation).

* cited by examiner

DATA TRANSMISSION METHOD OF SYSTEM, USER EQUIPMENT, AND BASE STATION

CROSS-REFERENCE TO RELATED APPLICATIONS

This application is a national stage of International Application No. PCT/CN2015/096971, filed on Dec. 10, 2015, which is hereby incorporated by reference in its entirety.

TECHNICAL FIELD

The present invention relates to the field of communications technologies, and specifically, to a data transmission method of a full-duplex (Full Duplex, FD) system, and a base station and a user equipment that are based on this method.

BACKGROUND

As a service volume of the mobile Internet rapidly grows, a capacity problem of an LTE (Long Term Evolution, Long Term Evolution) communications system becomes increasingly noticeable, and there is an urgent need to improve spectral efficiency to enhance a network capacity. In this background, a full-duplex technology in which data transmission is performed by using an eNB (Enhanced Node B, evolved NodeB) attracts more attention. The full-duplex technology means that the eNB simultaneously sends downlink data and receives uplink data on a same frequency band and by using a same subframe, thereby doubling the spectral efficiency to enhance the network capacity.

Full-duplex transmission is initiated by the eNB. Therefore, before the initiation, the eNB needs to confirm that buffer and preparation statuses of a UE (User Equipment, user equipment) meet a requirement. However, this confirmation process can be completed only after the UE sends related signaling to the eNB. This definitely increases load of an entire system, easily leads to excessively high signaling overheads during data transmission, and increases a transmission delay.

SUMMARY

In view of this, embodiments of the present invention provide a data transmission method of a system, a user equipment, and a base station, so that the UE can initiate full-duplex transmission, so as to avoid excessively high signaling overheads and reduce a transmission delay.

Technical solutions used in the embodiments of the present invention are as follows:

According to a first aspect, a data transmission method of a system is provided, including: monitoring, by a user equipment UE, a grant instruction delivered by an evolved NodeB eNB, where the grant instruction is used to instruct the UE to add uplink data to a designated resource; and adding, by the UE, to-be-transmitted uplink data to the designated resource identified by the grant instruction, and transmitting the to-be-transmitted uplink data to the eNB.

With reference to the first aspect, in a first possible implementation, the grant instruction is carried on a physical downlink control channel PDCCH of downlink subframes, or is carried on a PDCCH of uplink subframes.

With reference to the first possible implementation of the first aspect, in a second possible implementation, the grant instruction carries control information and transmit power required for data transmission; and the method further includes: adding, by the UE, the control information to the to-be-transmitted uplink data; and adding, to the designated resource, the uplink data to which the control information is added, and transmitting the to-be-transmitted uplink data to the eNB based on the transmit power, so that the eNB obtains the uplink data according to the control information.

With reference to the second possible implementation of the first aspect, in a third possible implementation, before the adding, by the UE, the control information to the to-be-transmitted uplink data, the method includes: detecting whether the UE has a full-duplex capability and whether an uplink buffer is empty; and when the UE has the full-duplex capability and the uplink buffer is not empty, learning, by the UE according to the grant instruction, whether the UE is allowed to perform uplink data transmission, and when the UE is allowed to perform uplink data transmission, performing, by the UE, the step of adding the control information to the to-be-transmitted uplink data.

With reference to the second possible implementation of the first aspect, in a fourth possible implementation, the grant instruction further includes a first preset delay, and the UE adds the control information to the to-be-transmitted uplink data within the first preset delay.

With reference to the first aspect, in a fifth possible implementation, the system includes multiple UEs, the grant instruction further includes an indicator and a second preset delay, and the indicator is used to designate a specific UE to transmit, to the eNB, the uplink data that is carried on the designated resource, so that the eNB detects and parses the designated resource and feeds back a result within the second preset delay.

With reference to the first aspect, in a sixth possible implementation, the system includes multiple UEs, the grant instruction further includes a packet identifier, and the packet identifier is used to identify multiple designated resources that may be used by the UE that performs data transmission; and the multiple UEs perform data transmission with the eNB according to a packet identifier obtained by each UE, so that when at least two UEs perform the transmission with the eNB by using the multiple designated resources, the eNB detects and parses a designated resource identified by the packet identifier, so as to obtain the uplink data.

With reference to the sixth possible implementation of the first aspect, in a seventh possible implementation, the system includes multiple UEs, the grant instruction further includes information about frequency orthogonal space or code orthogonal space, and the multiple UEs perform data transmission with the eNB according to the frequency orthogonal space or code orthogonal space; and when at least two UEs perform data transmission with the eNB by using a same designated resource, the eNB detects and parses a designated resource identified by the frequency orthogonal space or code orthogonal space, so as to obtain the uplink data.

According to a second aspect, a data transmission method of a system is provided, including: delivering, by an eNB, a grant instruction to UE, where the grant instruction is used to instruct the UE to add uplink data to a designated resource; and receiving, by the eNB, uplink data transmitted by the UE, where the uplink data is carried on the designated resource identified by the grant instruction.

With reference to the second aspect, in a first possible implementation, the eNB delivers the grant instruction to the UE by using a PDCCH of downlink subframes or a PDCCH of uplink subframes.

With reference to the first possible implementation of the second aspect, in a second possible implementation, the grant instruction further carries control information and transmit power required for data transmission; and the eNB receives, based on the transmit power, uplink data that is transmitted by the UE and to which the control information is added, and obtains, according to the control information, the uplink data that is carried on the designated resource.

With reference to the second possible implementation of the second aspect, in a third possible implementation, the grant instruction identifies multiple designated resources, the UE performs data transmission with the eNB by using the multiple designated resources, and the eNB detects and parses all of the multiple designated resources to obtain the uplink data; or the control information includes a preset detection mode, and the eNB detects and parses the multiple designated resources according to the preset detection mode, so as to obtain the uplink data.

With reference to the second possible implementation of the second aspect, in a fourth possible implementation, the grant instruction further includes a first preset delay, and the UE adds the control information to the uplink data within the first preset delay.

With reference to the second aspect, in a fifth possible implementation, the system includes multiple UEs, the grant instruction further includes an indicator and a second preset delay, and the indicator is used to designate a specific UE to transmit, to the eNB, the uplink data that is carried on the designated resource, so that the eNB detects and parses the designated resource and feeds back a result within the second preset delay.

With reference to the second aspect, in a sixth possible implementation, the system includes multiple UEs, the grant instruction further includes a packet identifier, and the packet identifier is used to identify multiple designated resources that may be used by the UE that performs data transmission, and the multiple UEs perform uplink data transmission with the eNB according to a packet identifier obtained by each UE; and when at least two UEs perform data transmission with the eNB by using the multiple designated resources, the eNB detects and parses a designated resource identified by the packet identifier, so as to obtain the uplink data.

With reference to the sixth possible implementation of the second aspect, in a seventh possible implementation, the grant instruction further includes information about frequency orthogonal space or code orthogonal space, and the multiple UEs perform uplink data transmission with the eNB according to the frequency orthogonal space or code orthogonal space; and when at least two UEs perform data transmission with the eNB by using a same designated resource, the eNB detects and parses a designated resource identified by the frequency orthogonal space or code orthogonal space, so as to obtain the uplink data.

According to a third aspect, a user equipment UE is provided, including: a monitoring module, configured to monitor a grant instruction delivered by an eNB, where the grant instruction is used to instruct the UE to add uplink data to a designated resource; and a loading and transmission module, configured to: add to-be-transmitted uplink data to the designated resource identified by the grant instruction, and transmit the to-be-transmitted uplink data to the eNB.

With reference to the third aspect, in a first possible implementation, the grant instruction is carried on a physical downlink control channel PDCCH of downlink subframes, or is carried on a PDCCH of uplink subframes.

With reference to the first possible implementation of the third aspect, in a second possible implementation, the grant instruction further carries control information and transmit power required for data transmission; the UE further includes an addition module, configured to add the control information to the to-be-transmitted uplink data; and the loading and transmission module is configured to: add, to the designated resource, the uplink data to which the control information is added, and transmit the to-be-transmitted uplink data to the eNB based on the transmit power.

With reference to the second possible implementation of the third aspect, in a third possible implementation, the UE further includes: a detection module, configured to detect whether the UE has a full-duplex capability and whether an uplink buffer is empty; and a determining module, configured to: when the UE has the full-duplex capability and the uplink buffer is not empty, and learn, according to the grant instruction, whether the UE is allowed to perform uplink data transmission, where the addition module is configured to add the control information to the to-be-transmitted uplink data when it is learned that the UE is allowed to perform uplink data transmission.

With reference to the second possible implementation of the third aspect, in a fourth possible implementation, the grant instruction further includes a first preset delay, and the addition module adds the control information to the to-be-transmitted uplink data within the first preset delay.

According to a fourth aspect, a base station is provided, including: a delivery module, configured to deliver a grant instruction to UE, where the grant instruction is used to instruct the UE to add uplink data to a designated resource; and a receiving module, configured to receive uplink data transmitted by the UE, where the uplink data is carried on the designated resource identified by the grant instruction.

With reference to the fourth aspect, in a first possible implementation, the delivery module delivers the grant instruction to the UE by using a PDCCH of downlink subframes or a PDCCH of uplink subframes.

With reference to the first possible implementation of the fourth aspect, in a second possible implementation, the grant instruction further carries control information and transmit power required for data transmission; and the receiving module receives, based on the transmit power, uplink data that is transmitted by the UE and to which the control information is added, and obtains, according to the control information, the uplink data that is carried on the designated resource.

With reference to the second possible implementation of the fourth aspect, in a third possible implementation, the grant instruction identifies multiple designated resources, the UE performs data transmission with the base station by using the multiple designated resources, and the base station further includes a detection and parsing module, configured to detect and parse all of the multiple designated resources to obtain the uplink data; or the control information includes a preset detection mode, and a detection and parsing module is configured to detect and parse the multiple designated resources according to the preset detection mode, so as to obtain the uplink data.

With reference to the fourth aspect, in a fourth possible implementation, the grant instruction further includes an indicator and a preset delay, the indicator is used to designate a specific UE in multiple UEs to transmit, to the base station, the uplink data that is carried on the designated resource, and a detection and parsing module detects and parses the designated resource and feeds back a result within the preset delay.

With reference to the fourth aspect, in a fifth possible implementation, the grant instruction further includes a packet identifier, and the packet identifier is used to identify multiple designated resources that may be used by the UE that performs data transmission, and multiple UEs perform uplink data transmission with the base station according to a packet identifier obtained by each UE; and a detection and parsing module is configured to: when at least two of the multiple UEs perform data transmission with the base station by using the multiple designated resources, detect and parse a designated resource identified by the packet identifier, so as to obtain the uplink data.

With reference to the fifth possible implementation of the fourth aspect, in a sixth possible implementation, the grant instruction further includes information about frequency orthogonal space or code orthogonal space, and the multiple UEs perform uplink data transmission with the eNB according to the frequency orthogonal space or code orthogonal space; and the detection and parsing module is configured to: when at least two of the multiple UEs perform data transmission with the base station by using a same designated resource, detect and parse a designated resource identified by the frequency orthogonal space or code orthogonal space, so as to obtain the uplink data.

According to a fifth aspect, a user equipment UE is provided, including: a receiver, a transmitter, and a processor; the receiver is configured to monitor a grant instruction delivered by an eNB, where the grant instruction is used to instruct the UE to add uplink data to a designated resource; and the processor is configured to: add to-be-transmitted uplink data to the designated resource identified by the grant instruction, and control the transmitter to transmit the to-be-transmitted uplink data to the eNB.

With reference to the fifth aspect, in a first possible implementation, the grant instruction is carried on a physical downlink control channel PDCCH of downlink subframes, or is carried on a PDCCH of uplink subframes.

With reference to the first possible implementation of the fifth aspect, in a second possible implementation, the grant instruction further carries control information and transmit power required for data transmission; and the processor is configured to: add the control information to the to-be-transmitted uplink data, and control the transmitter to: add, to the designated resource, the uplink data to which the control information is added, and transmit the to-be-transmitted uplink data to the eNB based on the transmit power.

With reference to the second possible implementation of the fifth aspect, in a third possible implementation, the processor is further configured to: detect whether the UE has a full-duplex capability and whether an uplink buffer is empty; when the UE has the full-duplex capability and the uplink buffer is not empty, learn, according to the grant instruction, whether the UE is allowed to perform uplink data transmission; and when the UE is allowed to perform uplink data transmission, add the control information to the to-be-transmitted uplink data.

With reference to the second possible implementation of the fifth aspect, in a fourth possible implementation, the grant instruction further includes a first preset delay, and the processor adds the control information to the to-be-transmitted uplink data within the first preset delay.

According to a sixth aspect, a base station is provided, including a receiver, a transmitter, and a processor; the processor is configured to generate a grant instruction, where the grant instruction is used to instruct the UE to add uplink data to a designated resource; the transmitter is configured to deliver the grant instruction to UE; and the receiver is configured to receive uplink data transmitted by the UE, where the uplink data is carried on the designated resource identified by the grant instruction.

With reference to the sixth aspect, in a first possible implementation, the processor delivers the grant instruction to the UE by using a PDCCH of downlink subframes or a PDCCH of uplink subframes.

With reference to the first possible implementation of the sixth aspect, in a second possible implementation, the grant instruction further carries control information and transmit power required for data transmission; and the processor controls the receiver to: receive, based on the transmit power, uplink data that is transmitted by the UE and to which the control information is added, and obtain, according to the control information, the uplink data that is carried on the designated resource.

With reference to the first possible implementation of the sixth aspect, in a third possible implementation, the grant instruction identifies multiple designated resources, the UE performs data transmission with the base station by using the multiple designated resources, and the processor is configured to detect and parse all of the multiple designated resources to obtain the uplink data; or the control information includes a preset detection mode, and the processor is configured to detect and parse the multiple designated resources according to the preset detection mode, so as to obtain the uplink data.

With reference to the sixth aspect, in a fourth possible implementation, the grant instruction further includes an indicator and a preset delay, the indicator is used to designate a specific UE in multiple UEs to transmit, to the base station, the uplink data that is carried on the designated resource, and the processor detects and parses the designated resource and feeds back a result within the preset delay.

With reference to the sixth aspect, in a fifth possible implementation, the grant instruction further includes a packet identifier, the packet identifier is used to identify multiple designated resources that may be used by the UE that performs data transmission, and multiple UEs perform uplink data transmission with the base station according to a packet identifier obtained by each UE; and the processor is configured to: when at least two of the multiple UEs perform data transmission with the base station by using the multiple designated resources, detect and parse a designated resource identified by the packet identifier, so as to obtain the uplink data.

With reference to the fifth possible implementation of the sixth aspect, in a sixth possible implementation, the grant instruction further includes information about frequency orthogonal space or code orthogonal space, and the multiple UEs perform uplink data transmission with the base station according to the frequency orthogonal space or code orthogonal space; and the processor is configured to: when at least two of the multiple UEs perform data transmission with the base station by using a same designated resource, detect and parse a designated resource identified by the frequency orthogonal space or code orthogonal space, so as to obtain the uplink data.

According to the data transmission method, the user equipment, and the base station in the embodiments of the present invention, the UE is allowed to initiate full-duplex transmission, and it is unnecessary for the eNB to initiate full-duplex transmission. Therefore, before the initiation, the UE does not need to notify the eNB of buffer and preparation statuses of the UE. That is, the UE does not need to send related signaling to the eNB, thereby alleviating load of an entire LTE communications system, avoiding excessively high signaling overheads during data transmission, and reducing a transmission delay.

DESCRIPTION OF EMBODIMENTS

To make the objectives, technical solutions, and advantages of the present invention clearer and more comprehensible, the following further describes the present invention in detail with reference to the accompanying drawings and exemplary embodiments.

In an LTE system with scheduling-based MAC (Media Access Control, media access control), both UL (Uplink, uplink) data transmission and DL (Downlink, downlink) data transmission are scheduled by an eNB. That is, the eNB allocates, by using downlink control signaling, a frequency resource based on a condition of a channel between the eNB and a UE and buffer statuses (buffer status) of the eNB and the UE. In a solution of scheduling full-duplex transmission by the eNB, if there is DL data in a buffer of the eNB, and there is UL data in a buffer of the UE, the eNB allocates one frequency resource, so that the UE detects the DL data during uplink transmission.

Different from the prior art, in the embodiments of the present invention, the UE is allowed to initiate full-duplex transmission, and it is unnecessary for the eNB to initiate full-duplex transmission. Before the initiation, the UE only needs to confirm that buffer and statuses of the UE meet a requirement of full-duplex transmission, and does not need to notify the eNB. That is, the UE does not need to send related signaling to the eNB, thereby alleviating load of an entire system, avoiding excessively high signaling overheads during data transmission, and reducing a transmission delay.

Figure 1:
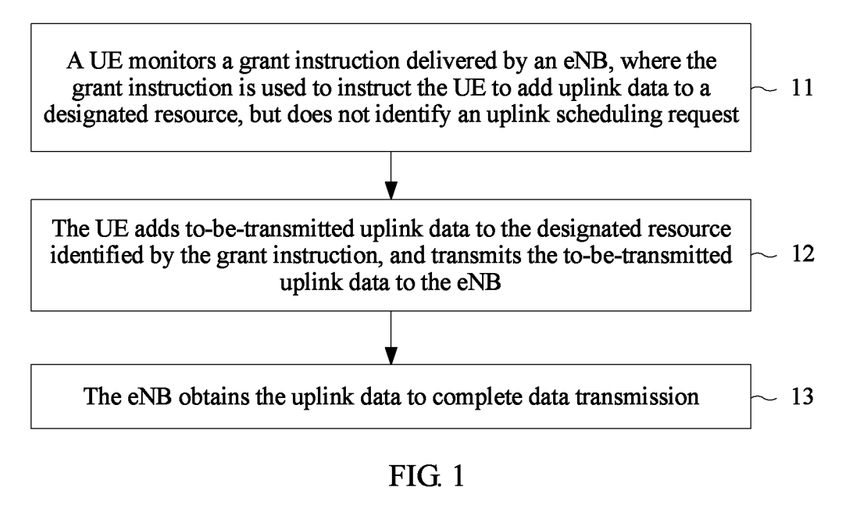
FIG. 1 is a schematic flowchart of a data transmission method according to an embodiment of the present invention.

Referring to FIG. 1, a specific implementation includes the following steps:

S11: A UE monitors a grant instruction delivered by an eNB, where the grant instruction is used to instruct the UE to add uplink data to a designated resource, but does not identify an uplink scheduling request (Scheduling Request, SR).

In an application scenario of a full-duplex system, the UE may monitor the grant instruction delivered by the eNB on a PDCCH (Physical Downlink Control Channel, physical downlink control channel) of downlink subframes (DL subframes), or may monitor the grant instruction on a PDCCH of uplink subframes.

Uplink data is data sent by the UE to the eNB, and data sent by the eNB to the UE is downlink data.

S12: The UE adds to-be-transmitted uplink data to the designated resource identified by the grant instruction, and transmits the to-be-transmitted uplink data to the eNB.

S13: The eNB obtains the uplink data to complete data transmission.

In this embodiment of the present invention, the grant instruction may be carried on the PDCCH of the downlink subframes, and a grant instruction carried on the PDCCH of the downlink subframes is a downlink grant instruction, that is, the grant instruction is equivalent to an extended downlink grant instruction. Alternatively, the grant instruction may be carried on the PDCCH of the uplink subframes, that is, the grant instruction is equivalent to an uplink grant instruction. Specifically, the UE defines one PDCCH in downlink subframes, and the downlink subframes switch to uplink subframes in a preset time period. In this case, the defined PDCCH changes to a PDCCH of the uplink subframes.

Figure 2:
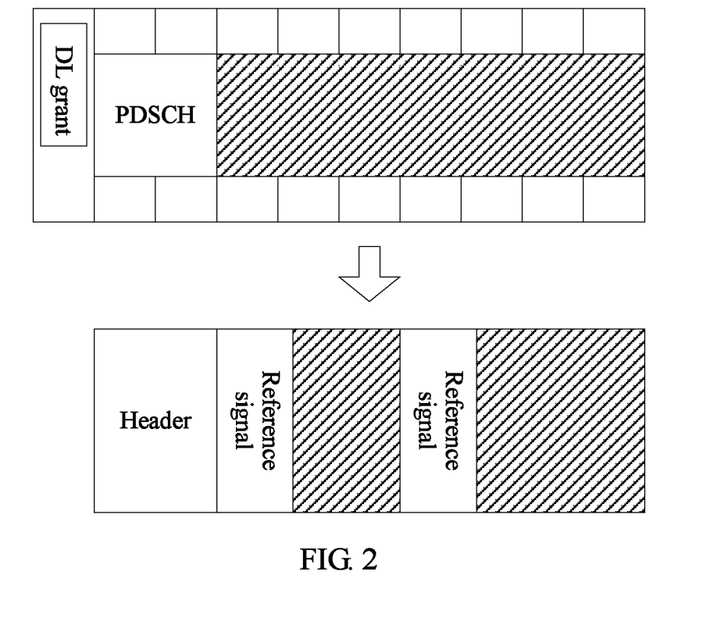
FIG. 2 is a schematic diagram of adding control information to a designated resource by a UE according to the present invention.

An LTE system in a TDD (Time Division Duplexing, time division duplex) mode is used as an example. The eNB divides one radio subframe into ten subframes, and the ten subframes are separately used as downlink subframes and uplink subframes by the UE. Different quantities of downlink subframes and uplink subframes are configured to match unsymmetrical uplink and downlink transmission services. For example, as shown in FIG. 2, the eNB divides one radio subframe into ten subframes, and the ten subframes are used as downlink subframes. A shaded part represents to-be-transmitted uplink data that is carried on a designated resource. The UE monitors, in the downlink subframes, the grant instruction delivered by the eNB, so as to learn a resource (that is, a designated resource) that is used for full-duplex transmission.

Different from an uplink grant instruction delivered when the eNB initiates full-duplex transmission, the grant instruction includes no scheduling request, that is, includes no signaling that is sent by the eNB to the UE and that is used to learn buffer and preparation statuses of the UE. Further, optionally, the grant instruction carries control information and/or transmit power required for full-duplex transmission. The control information is used to identify related information of uplink data, and a scheme used by the eNB to subsequently detect and parse a designated resource that carries the uplink data.

Based on this, before the UE adds the uplink data to the designated resource, and transmits the to-be-transmitted uplink data to the eNB based on the transmit power, the UE further needs to add the control information to the to-be-transmitted uplink data.

Before the UE adds control information to a designated resource identified by a second grant instruction, the UE needs to determine whether a full-duplex preparation status and a buffer meet a requirement of full-duplex transmission. Specifically:

if the UE currently has no full-duplex capability or an uplink buffer is empty (that is, there is no UL data in the buffer), the UE requires no uplink transmission, and in this case, the UE does not need to add the control information to the designated resource; or if the UE currently has a full-duplex capability and an uplink buffer is not empty, the UE learns, according to a second grant instruction that is obtained, by the UE, by means of monitoring and that is delivered by the eNB, whether the UE is allowed to transmit the designated resource.

Referring to FIG. 2 again, when it is learned that the UE is allowed to transmit the designated resource, the UE uses necessary control information to add a header (header) to a payload, that is, an uplink data packet. The control information is, for example, any combination of an adaptive modulation and coding (Adaptive Modulation and Coding, AMC) scheme, a data packet length, or a demodulation reference signal (De Modulation Reference Signal, DMRS).

On an eNB side, the eNB performs blind detection in any possible full-duplex area (the shaded part shown in FIG. 2) of the downlink subframes. In this embodiment of the present invention, because UL transmission is not controlled by the eNB, the eNB cannot learn an adaptive modulation and coding scheme for UL data. Therefore, the eNB first performs blind detection on the header to obtain the control information, so as to demodulate and decode data information in the data packet (in the figure, an abbreviation FD of full duplex (Full Duplex) represents the data information), and then the eNB generates a HARQ (Hybrid Automatic Repeat reQuest, hybrid automatic repeat request) based on DTX (Discontinuous Transmission, discontinuous transmission) detection and CRC (Cyclic Redundancy Check, cyclic redundancy check code) again, and sends the HARQ to the UE by using a physical downlink control channel, so as to form a PHICH (Physical Hybrid ARQ Indicator Channel, physical hybrid ARQ indicator channel) in the LTE system.

In this embodiment of the present invention, the grant instruction may further include a first preset delay. The first preset delay allows the UE to have time to prepare the uplink data, that is, to add the control information to the uplink data. The UE completes addition of the control information to the uplink data within the first preset delay. Likewise, the grant instruction may include a second preset delay. The eNB detects and parses the control information of the designated resource and feeds back a result within the second preset delay. The feedback result is ACK/NACK/DTX (acknowledge/Nacknowledge/Discontinuous Transmission, acknowledgement/negative acknowledgement/discontinuous transmission) information in the LTE system.

Certainly, in this embodiment of the present invention, the grant instruction may further include other information. For example, the grant instruction may be used to indicate whether the PDSCH is scheduled for uplink transmission of another UE, and in this case, the included information may be an identifier code. For example, an identifier code "0" indicates that the PDSCH is currently idle and may be used for full-duplex transmission, and an identifier code "1" indicates that the PDSCH is scheduled for uplink transmission of another UE. The following describes in detail an application scenario that is applicable to the full-duplex system and that includes multiple UEs.

(1) The grant instruction includes an indicator. The indicator is used to designate a specific UE in multiple UEs to perform data transmission on the designated resource. That is, the indicator is used by each UE to learn whether data transmission of a designated resource for this full-duplex transmission is performed by the UE. Then, the UE adds the control information to the uplink data according to the indicator, so as to perform uplink transmission to transmit the uplink data to the eNB and complete full-duplex transmission.

(2) The grant instruction includes a packet identifier. The packet identifier is used to identify UE that performs full-duplex transmission; that is, the packet identifier is used to packetize uplink data for full-duplex transmission. Then, multiple UEs transmit the uplink data to the eNB according to a packet identifier obtained by each UE. When at least two UEs perform full-duplex transmission with the eNB by using multiple designated resources, the eNB detects the control information according to a designated resource indicated by the packet identifier, and obtains uplink data that is carried on the designated resource.

This embodiment is applied to an application scenario in which PDSCHs of the multiple UEs are used for full-duplex transmission. The grant instruction indicates multiple designated resources by using the packet identifier, and the eNB may learn, according to the packet identifier, a specific group of designated resources that can be searched to detect the uplink data, thereby reducing a quantity of detections.

(3) The grant instruction further includes the packet identifier and information about frequency orthogonal space or code orthogonal space. Multiple UEs transmit the uplink data to the eNB according to the packet identifier and frequency orthogonal space or code orthogonal space that are obtained by each UE. When at least two UEs perform data transmission with the eNB by using a same designated resource, the eNB detects and parses a designated resource identified by the packet identifier and the frequency orthogonal space or code orthogonal space, so as to obtain the uplink data.

This embodiment is applied to an application scenario in which the multiple UEs randomly select one designated resource for full-duplex transmission. Two UEs may select a same designated resource. Therefore, the eNB may instruct, by using the grant instruction, different UEs to correspond to different packets and different frequency orthogonal space or code orthogonal space. The frequency orthogonal space or code orthogonal space may be frequency space or a PRB (Physical Resource Block, physical resource block), or may certainly be code space, such as a reference signal.

Figure 3:
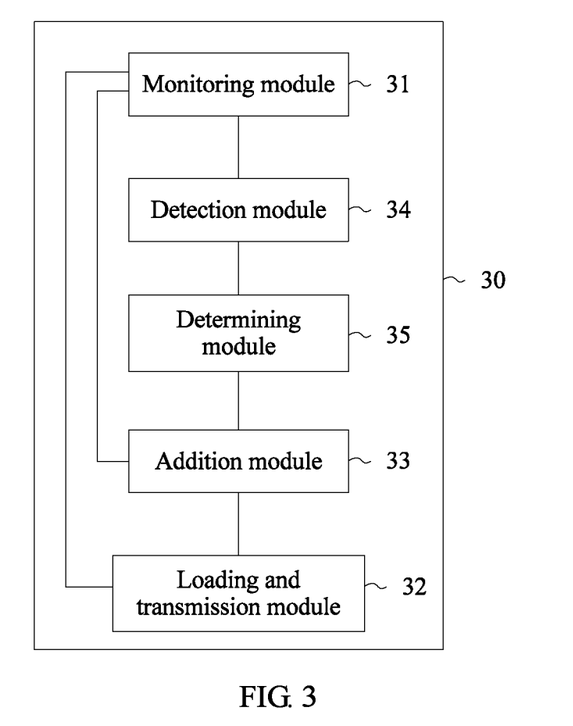
FIG. 3 is a schematic diagram of functional blocks of a UE according to an embodiment of the present invention.

FIG. 3 is a schematic diagram of functional blocks of a user equipment according to an embodiment of the present invention. As shown in FIG. 3, the user equipment 30 includes: a monitoring module 31, configured to monitor a grant instruction delivered by a base station, where the grant instruction is used to instruct the user equipment 30 to add uplink data to a designated resource; and a loading and transmission module 32, configured to: add to-be-transmitted uplink data to the designated resource identified by the grant instruction, and transmit the to-be-transmitted uplink data to the base station.

Optionally, the grant instruction is carried on a PDCCH of downlink subframes or on a PDCCH of uplink subframes.

Optionally, the grant instruction further carries control information and transmit power required for data transmission. An addition module 33 of the user equipment 30 is configured to add control information to the to-be-transmitted uplink data. Then the loading and transmission module 32 adds, to a designated resource, the uplink data to which the control information is added, and transmit the to-be-transmitted uplink data to the base station based on the transmit power.

Optionally, the user equipment 30 further includes a detection module 34 and a determining module 35. The detection module 34 is configured to detect whether the user equipment 30 has a full-duplex capability and whether an uplink buffer is empty. The determining module 35 is configured to: when the user equipment 30 has the full-duplex capability and the uplink buffer is not empty, learn, according to the grant instruction, whether the user equipment 30 is allowed to perform uplink data transmission. The addition module 33 is configured to add the control information to the to-be-transmitted uplink data when it is learned that the user equipment 30 is allowed to perform uplink data transmission.

Optionally, the grant instruction further includes a first preset delay, and the addition module 33 adds the control information to the to-be-transmitted uplink data within the first preset delay.

Figure 4:
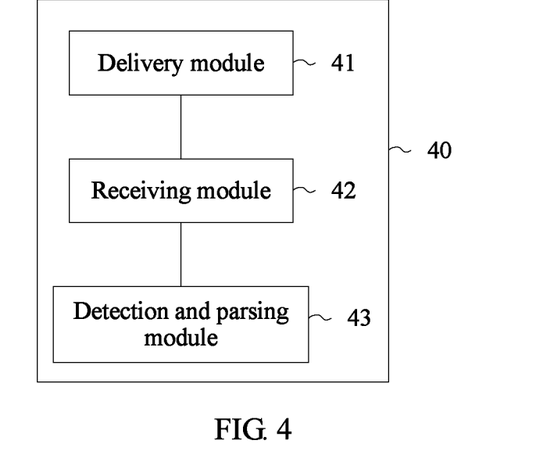
FIG. 4 is a schematic diagram of functional blocks of an eNB according to an embodiment of the present invention.

FIG. 4 is a schematic diagram of functional blocks of a base station according to an embodiment of the present invention. As shown in FIG. 4, the base station 40 includes: a delivery module 41, configured to deliver a grant instruction to a user equipment, where the grant instruction is used to instruct the user equipment to add uplink data to a designated resource; and a receiving module 42, configured to receive uplink data transmitted by the user equipment, where the uplink data is carried on the designated resource identified by the grant instruction.

Optionally, the delivery module 41 delivers the grant instruction to the user equipment by using a PDCCH of downlink subframes or a PDCCH of uplink subframes.

Optionally, the grant instruction further carries control information and transmit power required for data transmission. The receiving module 42 receives, based on the transmit power, uplink data that is transmitted by the user equipment and to which the control information is added, and obtains, according to the control information, the uplink data that is carried on the designated resource.

Optionally, the grant instruction identifies multiple designated resources. The user equipment performs data transmission with the base station 40 by using the multiple designated resources. The base station 40 further includes a detection and parsing module 43, configured to detect and parse all of the multiple designated resources to obtain the uplink data; or the control information includes a preset detection mode, and a detection and parsing module 43 is configured to detect and parse the multiple designated resources according to the preset detection mode, so as to obtain the uplink data.

Optionally, the grant instruction further includes an indicator and a preset delay, and the indicator is used to designate a specific user equipment in multiple user equipments to transmit, to the base station 40, the uplink data that is carried on the designated resource. A detection and parsing module 43 detects and parses the designated resource and feeds back a result within the preset delay.

Optionally, the grant instruction further includes a packet identifier. The packet identifier is used to identify multiple designated resources that may be used by the user equipment that performs data transmission. Multiple user equipments perform uplink data transmission with the base station 40 according to a packet identifier obtained by each user equipment. A detection and parsing module 43 is configured to: when at least two of the multiple user equipments perform data transmission with the base station 40 by using the multiple designated resources, detect and parse a designated resource identified by the packet identifier, so as to obtain the uplink data.

Optionally, the grant instruction further includes information about frequency orthogonal space or code orthogonal space. For a usage scenario in which the multiple user equipments perform uplink data transmission with the base station 40 according to the frequency orthogonal space or code orthogonal space, a detection and parsing module 43 is configured to: when at least two of the multiple user equipments perform data transmission with the base station 40 by using a same designated resource, detect and parse a designated resource identified by the frequency orthogonal space or code orthogonal space, so as to obtain the uplink data.

The foregoing modules of the user equipment 30 and the base station 40 in the embodiments of the present invention correspondingly perform the data transmission method in the foregoing embodiment, and have same technical effects with the data transmission method.

It should be understood that implementations of the user equipment 30 and the base station 40 are merely examples. Module division is merely logical function division and may be other division in actual implementation. For example, two modules may be integrated into another system, or some features may be ignored or not performed. In addition, mutual connections between modules may be implemented by using some interfaces or in electrical or other forms. As components of the user equipment 30 and the base station 40, the foregoing modules may or may not be physical blocks; may be located in one position or may be distributed on multiple network units; and may be implemented in a form of a software functional block or may be implemented in a hardware form shown in FIG. 5 and FIG. 6.

Figure 5:
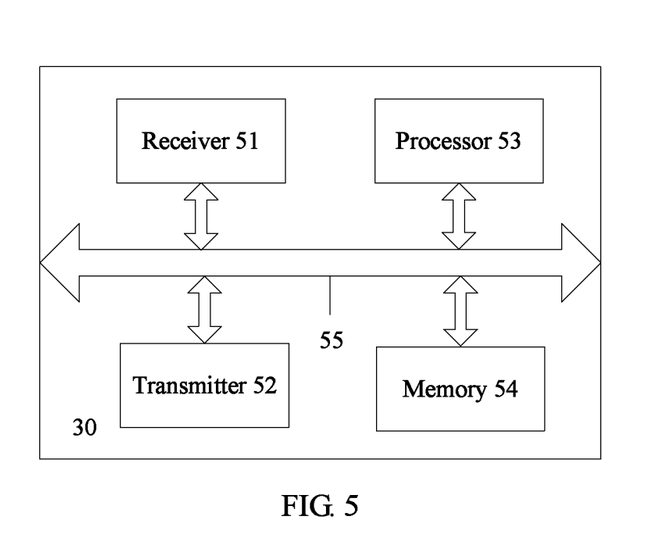
FIG. 5 is a schematic diagram of a hardware structure of a UE according to an embodiment of the present invention.

As shown in FIG. 5, user equipment 30 includes a receiver 51, a transmitter 52, a processor 53, a memory 54, and a bus 55. The receiver 51, the transmitter 52, the processor 53, and the memory 54 are connected by using the bus 55. The receiver 51 is configured to monitor a grant instruction delivered by a base station, and the grant instruction is used to instruct the user equipment 30 to add uplink data to a designated resource. Optionally, the grant instruction is carried on a physical downlink control channel PDCCH of downlink subframes, or is carried on a PDCCH of uplink subframes.

The memory 54 may be one or more of a computer floppy disk, a USB flash drive, a removable hard disk, a read-only memory (ROM, Read-Only Memory), a random access memory (RAM, Random Access Memory), a magnetic disk, an optical disc, or the like. The memory 54 stores an application program, which is used to implement the foregoing data transmission method.

By calling the application program in the memory 54, the processor 53 performs the following operations:

The processor 53 is configured to: add to-be-transmitted uplink data to the designated resource identified by the grant instruction, and control the transmitter 52 to transmit the to-be-transmitted uplink data to the base station.

Optionally, the grant instruction carries control information and transmit power required for data transmission. The processor 53 is configured to: add the control information to the to-be-transmitted uplink data, and control the transmitter 52 to: add, to a designated resource, the uplink data to which the control information is added, and transmit the to-be-transmitted uplink data to the base station based on the transmit power.

Optionally, the processor 53 is further configured to: detect whether the user equipment 30 has a full-duplex capability and whether an uplink buffer is empty; when the user equipment 30 has a full-duplex capability and the uplink buffer is not empty, learn, according to the grant instruction, whether the user equipment 30 is allowed to perform uplink data transmission; and when it is learned that the user equipment 30 is allowed to perform uplink data transmission, add the control information to the to-be-transmitted uplink data.

Optionally, the grant instruction further includes a first preset delay, and the processor 53 adds the control information to the to-be-transmitted uplink data within the first preset delay.

Figure 6:
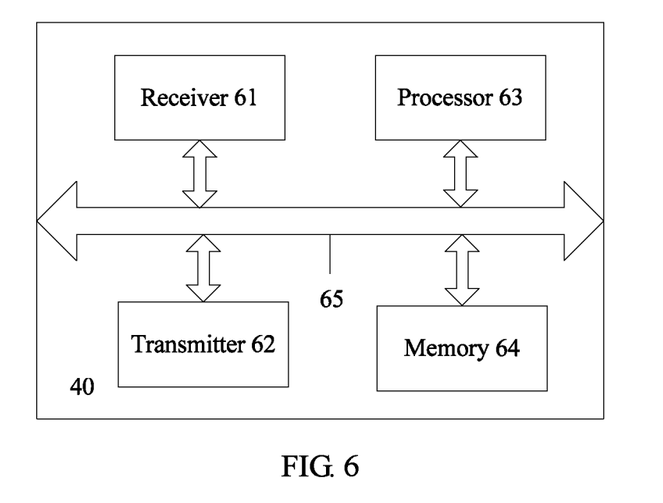
FIG. 6 is a schematic diagram of a hardware structure of an eNB according to an embodiment of the present invention.

As shown in FIG. 6, a base station 40 includes a receiver 61, a transmitter 62, a processor 63, a memory 64, and a bus

65. The receiver 61, the transmitter 62, the processor 63, and the memory 64 are connected by using the bus 65. The transmitter 62 is configured to deliver a grant instruction to a user equipment. The receiver 61 is configured to receive uplink data transmitted by the user equipment, where the uplink data is carried on the designated resource identified by the grant instruction.

The memory 64 may be one or more of a computer floppy disk, a USB flash drive, a removable hard disk, a read-only memory (ROM, Read-Only Memory), a random access memory (RAM, Random Access Memory), a magnetic disk, an optical disc, or the like. The memory 64 stores an application program, which is used to implement the foregoing data transmission method.

By calling the application program in the memory 64, the processor 63 performs the following operations:

The processor 63 generates the grant instruction, where the grant instruction is used to instruct the user equipment to add the uplink data to the designated resource; controls the transmitter 62 to deliver the grant instruction to the user equipment; and further controls the receiver 61 to receive the uplink data transmitted by the user equipment.

Optionally, the processor 63 delivers the grant instruction to the user equipment by using a PDCCH of downlink subframes or a PDCCH of uplink subframes.

Optionally, the grant instruction further carries control information and transmit power required for data transmission. The processor 63 controls the receiver 61 to: receive, based on the transmit power, uplink data that is transmitted by the user equipment and to which the control information is added, and obtain, according to the control information, the uplink data that is carried on the designated resource.

Optionally, the grant instruction identifies multiple designated resources, and the user equipment performs data transmission with the base station 40 by using the multiple designated resources. The processor 63 is configured to detect and parse all of the multiple designated resources to obtain the uplink data; or the control information includes a preset detection mode, and the processor 63 is configured to detect and parse the multiple designated resources according to the preset detection mode, so as to obtain the uplink data.

Optionally, the grant instruction further includes an indicator and a preset delay, and the indicator is used to designate a specific user equipment in multiple user equipments to transmit, to the base station 40, the uplink data that is carried on the designated resource. The processor 63 detects and parses the designated resource and feeds back a result within the preset delay.

Optionally, the grant instruction further includes a packet identifier, and the packet identifier is used to identify multiple designated resources that may be used by a user equipment that performs data transmission. Multiple user equipments perform uplink data transmission with the base station 40 according to a packet identifier obtained by each user equipment. The processor 63 is configured to: when at least two of the multiple user equipments perform data transmission with the base station 40 by using the multiple designated resources, detect and parse a designated resource identified by the packet identifier, so as to obtain the uplink data.

Optionally, the grant instruction further includes information about frequency orthogonal space or code orthogonal space, and the multiple user equipments perform uplink data transmission with the base station 40 according to the frequency orthogonal space or code orthogonal space. The processor 63 is configured to: when at least two of the multiple user equipments perform data transmission with the base station 40 by using a same designated resource, detect and parse a designated resource identified by the frequency orthogonal space or code orthogonal space, so as to obtain the uplink data.

It may be clearly understood by a person skilled in the art that, when the foregoing functions are implemented in a form of a software functional unit and sold or used as an independent product, the functions may be stored in a computer-readable storage medium, that is, the embodiments of the present invention may be implemented in a form of a software product. The software product includes several instructions for instructing a computer device (which may be a personal computer, a server, a network device, or the like) to perform all or some of the steps of the methods described in the embodiments of the present invention.

It is noted again that the foregoing descriptions are merely embodiments of the present invention, and the protection scope of the present invention is not limited thereto. All equivalent structure or process changes made according to the content of this specification and accompanying drawings or by directly or indirectly applying the present invention in other related technical fields shall fall within the protection scope of the present invention.

What is claimed is:

1. A data transmission method of a system, wherein the method comprises:
    monitoring, by a user equipment (UE), grant information delivered by an evolved NodeB (eNB), wherein the grant information is used to instruct the UE to add uplink data to a designated resource, wherein the grant information is included in a physical downlink control channel (PDCCH) of one or more downlink subframes or is included in a PDCCH of one or more uplink subframes, wherein the grant information includes control information and transmit power for data transmission, and wherein the designated resource is used for full-duplex transmission;
    detecting whether the UE has a full-duplex capability and whether an uplink buffer is empty;
    determining, by the UE according to the grant information, whether the UE is allowed to perform uplink data transmission if the UE is detected to have the full-duplex capability and the uplink buffer is not empty;
    adding, by the UE, the control information to the uplink data if the UE is determined to be allowed to perform uplink data transmission;
    adding, by the UE, the uplink data that includes the added control information to the designated resource identified by the grant information; and
    transmitting, by the UE, the uplink data to the eNB based on the transmit power.

2. The method according to claim 1, wherein the grant information further comprises a first preset delay, and the UE adds the control information to the uplink data within the first preset delay.

3. The method according to claim 1, wherein the system comprises multiple UEs; and
    the grant information further comprises an indicator and a second preset delay, and the indicator is used to designate a specific UE to transmit the uplink data that is included in the designated resource to the eNB for the eNB to detect and parse the designated resource and feed back a result within the second preset delay.

4. The method according to claim 1, wherein the system comprises multiple UEs;

the grant information further comprises a packet identifier, and the packet identifier is used to identify multiple designated resources used by the UE to perform the data transmission; and each of the multiple UEs performs the data transmission with the eNB according to a packet identifier obtained by the UE, wherein the eNB detects and parses a designated resource identified by the packet identifier to obtain the uplink data when at least two UEs perform the data transmission with the eNB by using the multiple designated resources.

5. The method according to claim 1, wherein the system comprises multiple UEs;

the grant information further comprises information about frequency orthogonal space or code orthogonal space, and the multiple UEs perform the data transmission with the eNB according to the frequency orthogonal space or code orthogonal space; and when at least two UEs perform the data transmission with the eNB by using a same designated resource, the eNB detects and parses a designated resource identified by the frequency orthogonal space or code orthogonal space to obtain the uplink data.

6. A user equipment (UE), wherein the UE comprises:

a receiver;

a transmitter;

at least one processor; and a non-transitory computer-readable storage medium coupled to the at least one processor and storing programming instructions for execution by the at least one processor, the programming instructions instruct the at least one processor to:

monitor a grant information delivered by an evolved NodeB (eNB), wherein the grant information is used to instruct the UE to add uplink data to a designated resource, wherein the grant information is included in a physical downlink control channel (PDCCH) of one or more downlink subframes or is included in a PDCCH of one or more uplink subframes, wherein the grant information includes control information and transmit power for data transmission, and wherein the designated resource is used for full-duplex transmission;

detect whether the UE has a full-duplex capability and whether an uplink buffer is empty;

determine, according to the grant information, whether the UE is allowed to perform uplink data transmission if the UE is detected to have the full-duplex capability and the uplink buffer is not empty;

add the control information to the uplink data if the UE is determined to be allowed to perform uplink data transmission;

add the uplink data that includes the added control information to the designated resource identified by the grant information; and control the transmitter to transmit the uplink data to the eNB based on the transmit power.

7. The UE according to claim 6, wherein the grant information further comprises a first preset delay, and the UE adds the control information to the uplink data within the first preset delay.

8. A system, comprising:

an evolved NodeB (eNB); and a user equipment (UE), wherein the UE performs operations comprising:

monitoring grant information delivered by the eNB, wherein the grant information is used to instruct the UE to add uplink data to a designated resource, wherein the grant information is included in a physical downlink control channel (PDCCH) of one or more downlink subframes or is included in a PDCCH of one or more uplink subframes, wherein the grant information includes control information and transmit power for data transmission, and wherein the designated resource is used for full-duplex transmission;

detecting whether the UE has a full-duplex capability and whether an uplink buffer is empty;

determining, according to the grant information, whether the UE is allowed to perform uplink data transmission if the UE is detected to have the full-duplex capability and the uplink buffer is not empty;

adding the control information to the uplink data if the UE is determined to be allowed to perform uplink data transmission;

adding the uplink data that includes the added control information to the designated resource identified by the grant information; and transmitting the uplink data to the eNB based on the transmit power.

9. The system according to claim 8, wherein the grant information further comprises a first preset delay, and the UE adds the control information to the uplink data within the first preset delay.

10. The system according to claim 8, wherein the system comprises multiple UEs; and the grant information further comprises an indicator and a second preset delay, and the indicator is used to designate a specific UE to transmit the uplink data that is included in the designated resource to the eNB for the eNB to detect and parse the designated resource and feed back a result within the second preset delay.

11. The system according to claim 8, wherein the system comprises multiple UEs;

the grant information further comprises a packet identifier, and the packet identifier is used to identify multiple designated resources used by the UE to perform the data transmission; and each of the multiple UEs performs the data transmission with the eNB according to a packet identifier obtained by the UE, wherein the eNB detects and parses a designated resource identified by the packet identifier to obtain the uplink data when at least two UEs perform the data transmission with the eNB by using the multiple designated resources.

12. The system according to claim 8, wherein the system comprises multiple UEs;

the grant information further comprises information about frequency orthogonal space or code orthogonal space, and the multiple UEs perform the data transmission with the eNB according to the frequency orthogonal space or code orthogonal space; and when at least two UEs perform the data transmission with the eNB by using a same designated resource, the eNB detects and parses a designated resource identified by the frequency orthogonal space or code orthogonal space to obtain the uplink data.

* * * * *